United States Patent [19]

Adams, Jr.

[11] Patent Number: 5,232,035
[45] Date of Patent: Aug. 3, 1993

[54] TIRE CHANGING TOOL AND WORKSTAND

[76] Inventor: Joseph E. Adams, Jr., McKern Rd., Rome, N.Y. 13440

[21] Appl. No.: 922,744

[22] Filed: Jul. 31, 1992

Related U.S. Application Data

[63] Continuation-in-part of Ser. No. 745,540, Aug. 15, 1991, Pat. No. 5,141,211.

[51] Int. Cl.⁵ .................................. B60C 25/06
[52] U.S. Cl. ........................... 157/1.17; 157/14
[58] Field of Search ............. 157/1.17, 1.1, 1.2, 157/1.22, 1.24, 1.26, 1.28, 14

[56] References Cited

U.S. PATENT DOCUMENTS

| | | | |
|---|---|---|---|
| 3,042,090 | 7/1962 | Foster | 157/1.28 X |
| 3,074,468 | 1/1963 | Tarazona | 157/14 X |
| 4,122,956 | 10/1978 | Hargrove | 269/16 X |
| 4,239,196 | 12/1980 | Hanger | 269/17 |
| 4,899,985 | 2/1990 | Good | 254/124 X |

*Primary Examiner*—D. S. Meislin
*Attorney, Agent, or Firm*—William M. Hobby, III

[57] ABSTRACT

A tire changing tool and universal workstand for use in a tire store or mechanic shop includes a base having a vertically extending post attached thereto. The work support members includes a vehicle wheel work support attachment removably attached to the top of the post for attaching and holding a vehicle wheel to the tire changing tool. The wheel attachment is attached to the post end so that the wheel can be fixedly attached and held in a horizontal plane. A tire removing tool is removably attached to one side of the post and positioned so that a wheel having a tire thereon can be placed adjacent the post so that the tire removing tool can be positioned adjacent the wheel rim flange against the tire and is leveraged for driving the tool to break the tire edge from the tire rim. The work support attachment is attached to the top of the vertically extending post with a post coupling having a square insert inserted into a square post top opening and having a flange cap thereover and having the vehicle wheel work support attached thereto. The wheel work support can be rapidly removed from the vertical post for converting the tire changing tool to a different type of work station.

7 Claims, 4 Drawing Sheets

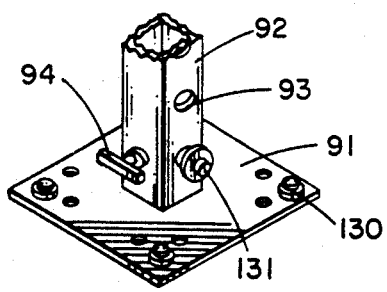
FIG. 4
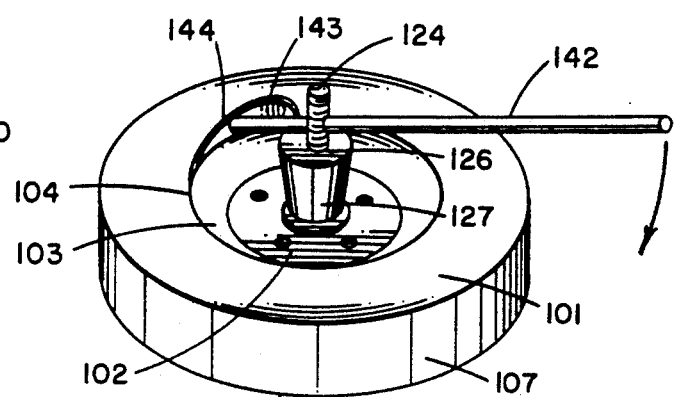
FIG. 6
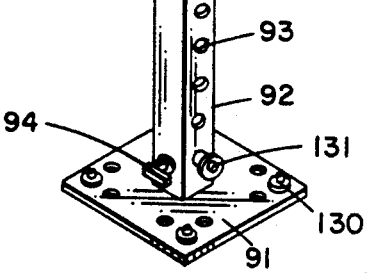
FIG. 7
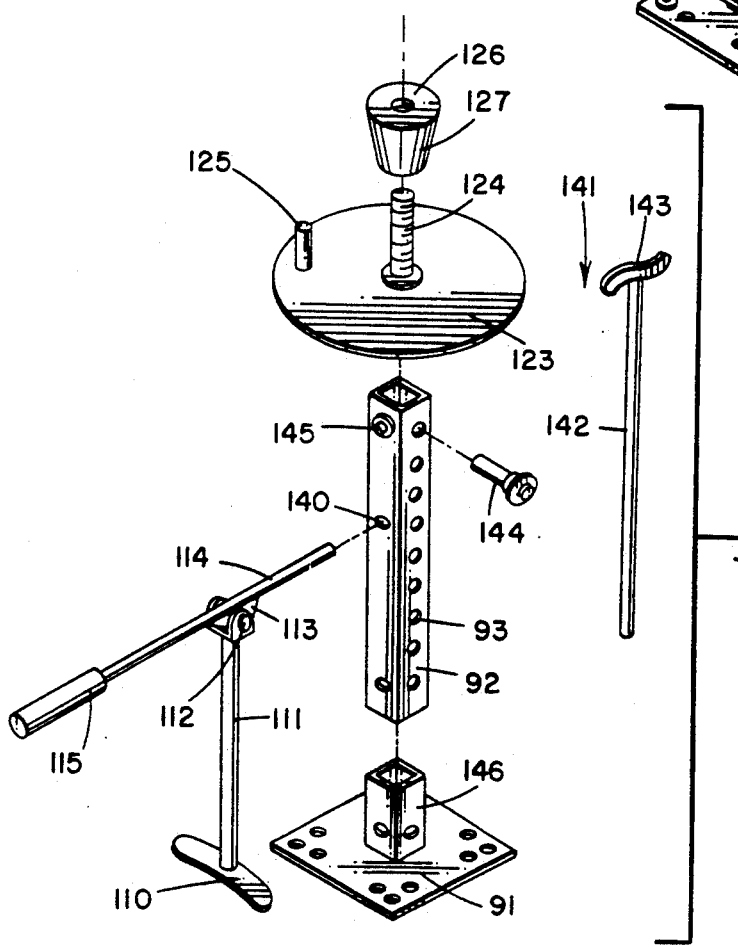

TIRE CHANGING TOOL AND WORKSTAND

This Application is a continuation in part of my prior patent application Ser. No. 07/745,540, filed Aug. 15, 1991, now U.S. Pat. No. 5,141,211, issued Aug. 25, 1992.

BACKGROUND OF THE INVENTION

The present invention relates to a universal work station and tire changing tool and especially to a tire changing tool and work station having a variety of other quick coupling tools and work holders therefor.

The present invention is directed towards a tire changing tool and universal work station which provides a work position and support by means of which tires may be supported thereon in different positions and tools may be properly positioned in different positions for rapid changing of tires on wheels and which tool can be rapidly changed for various work station configurations. Prior art work stations have been provided for supporting a great variety of work members and for supporting tools or the like. Sometimes these work member are provided with wheels or casters but typically the prior work holder is designed specifically to hold one specific type of work even though that work member may come in various sizes and shapes. Typical prior art work holders have long been devised for engines to bolt an engine block or engine directly thereto for supporting the engine while machine work or other work is being performed on the engine. These are commonly used in rebuilding or doing other machine work on internal combustion engines, such as found in automobiles. Other work stands are desired specifically to hold transmissions which are bolted onto a work station similar to that found in work holders for internal combustion engines. Other work holders have been designed for holding small engines which are note cantilevered such as to require extended support from the legs. It has also been common in the past to provide specific work holders for providing more precise alignment and this is common in work holders which hold automobile doors as well as doors for a building. The doors can be supported while they are painted or worked on and can be removed and replaced in precise alignment with the vehicle or building. It can also be used for mounting new doors and may have various types of adjustments for aligning the hinges for attaching the doors. Most of the prior art work supports either bolt the work to a specially designed fixture or have special clamps, brackets, or supporting surfaces to hold the workpiece while it is being worked upon and sometimes provides for adjusting the work piece to a variety of different positions or for final adjustments.

Prior art U.S. patents which show various types of work supports may be seen in the Hawkins et al. U.S. Pat. No. 4,705,264, for a wheeled stand assembly having an engine mount bracket for attaching an engine block thereto and utilizing a tray forming a frame for the base. This engine mount has two extending legs with four casters thereon. In the Hanger patent, U.S. Pat. No. 4,239,196, an engine stand is illustrated having a universal mounting apparatus for securing loads such as different size automotive engines. This engine stand is a wheeled stand having a pair of telescoping legs for increasing the support of the cantilevered engine and brackets that can be adjusted for attaching different engines. In the U.S. patent to Armstrong, U.S. Pat. No. 4,691,904, an automatic or standard transmission holding stand is provided which is wheeled and has attachments for transmissions which can be adjusted to different positions and the Friese patent, U.S. Pat. No. 2,188,433, a work holding device provides a uniform attachment system for attaching a variety of different work piece to a pair of spaced work supporting arms which can have various attachments attached thereto and can be rapidly moved in and out from each other. In the Anderson patent, U.S. Pat. No. 2,763,053, a universal work positioner allows a variety of adjustments through a universal joint to position a work piece in different positions. Similarly, the Webb patent, U.S. Pat. No. 4,145,006, is a work piece mounting stand having a variety of adjustments through which is universal and it allows a work piece to be rotated in any direction. The DeRouen patent, U.S. Pat. No. 4,209,166, is a universal jack and work positioning mechanism while the Krause patent, U.S. Pat. No. 2,488,296, is a work support which can position an article in various positions while work is being done on the article. The Valenta patent, U.S. Pat. No. 1,515,915, is a portable repair unit which is on wheels and having three vertically extending telescoping U-shape supports with one having a vise mounted thereon.

In contrast to these prior art devices, the present invention is directed to a tire changing tool which can be converted to a universal work station for use for holding and working on other mechanical components and can be rapidly configured with tool trays, a tool cleaning tray with rapid coupling and decoupling components.

SUMMARY OF THE INVENTION

A tire changing tool and universal workstand for use in a tire store or mechanic shop includes a base having a vertically extending post attached thereto. The work support members includes a vehicle wheel work support attachment removably attached to the top of the post for attaching and holding a vehicle wheel to the tire changing tool. The wheel attachment is attached to the post end so that the wheel can be attached and held in a horizontal plane. A tire removing tool is removably attached to one side of the post and positioned so that a wheel having a tire thereon can be placed adjacent the post so that the tire removing tool can be positioned adjacent the wheel rim flange against the tire and is leveraged for driving the tool to break the tire edge from the tire rim. The work support attachment is attached to the top of the vertically extending post with a post coupling having a square insert inserted into a square post top opening and having a flange cap thereover and having the vehicle wheel work support attached thereto. The wheel work support can be rapidly removed from the vertical post for converting the tire changing tool to a different type of work station.

BRIEF DESCRIPTION OF THE DRAWINGS

Other objects, features, and advantages of the present invention will be apparent from the written description and the drawings in which:

FIG. 4 is a perspective view of a cutaway of the base of the tire changing tool of FIG. 3;

FIG. 6 is a perspective view of the tire changing tool wheel support of FIG. 5 having a wheel attached thereto; and FIG. 7 is an exploded perspective view of the wheel tool of FIGS. 5 and 6.

DESCRIPTION OF THE PREFERRED EMBODIMENTS

Figure 1:
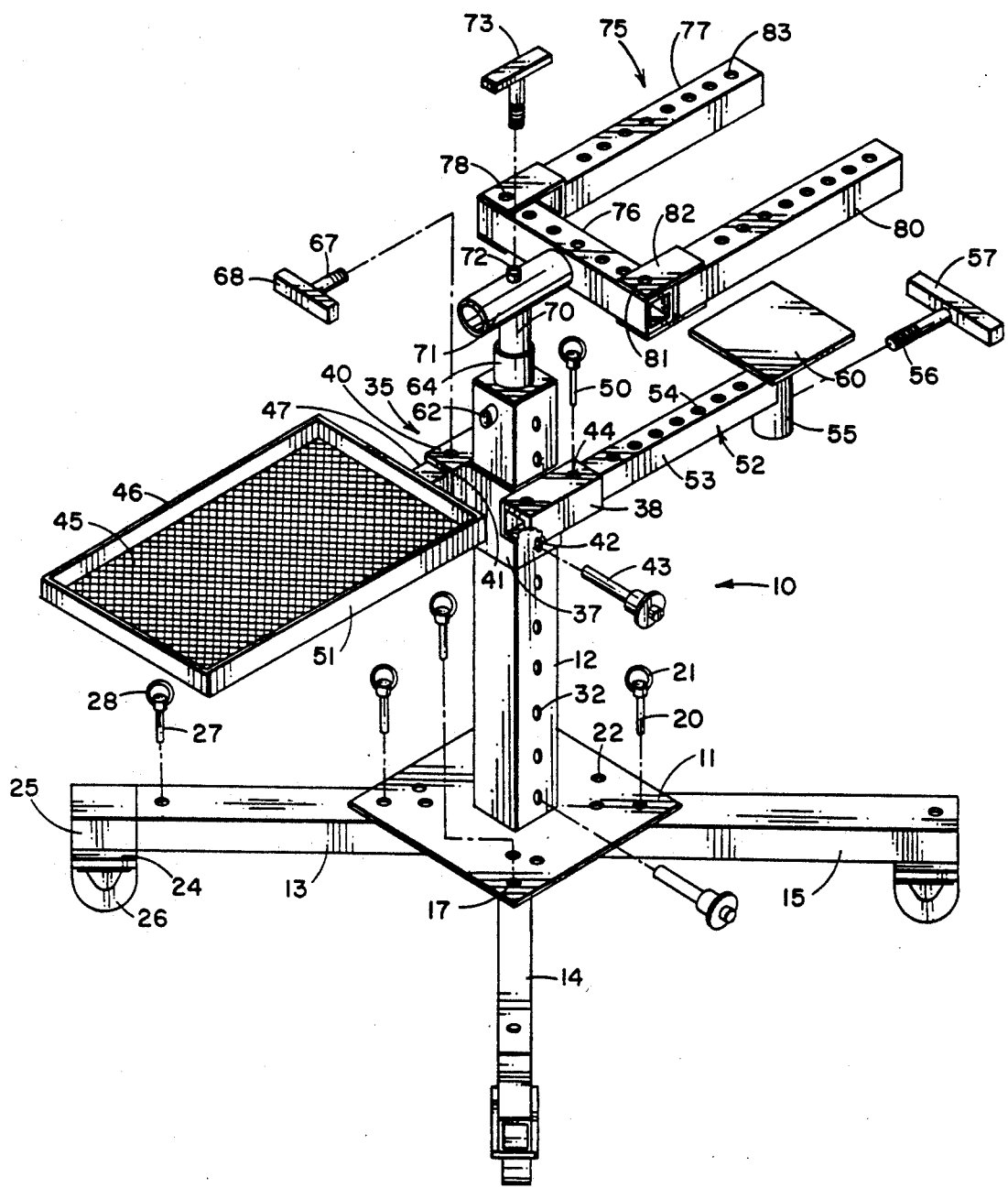
FIG. 1 is an perspective view of a work station for use in accordance with the present invention.
Figure 2:
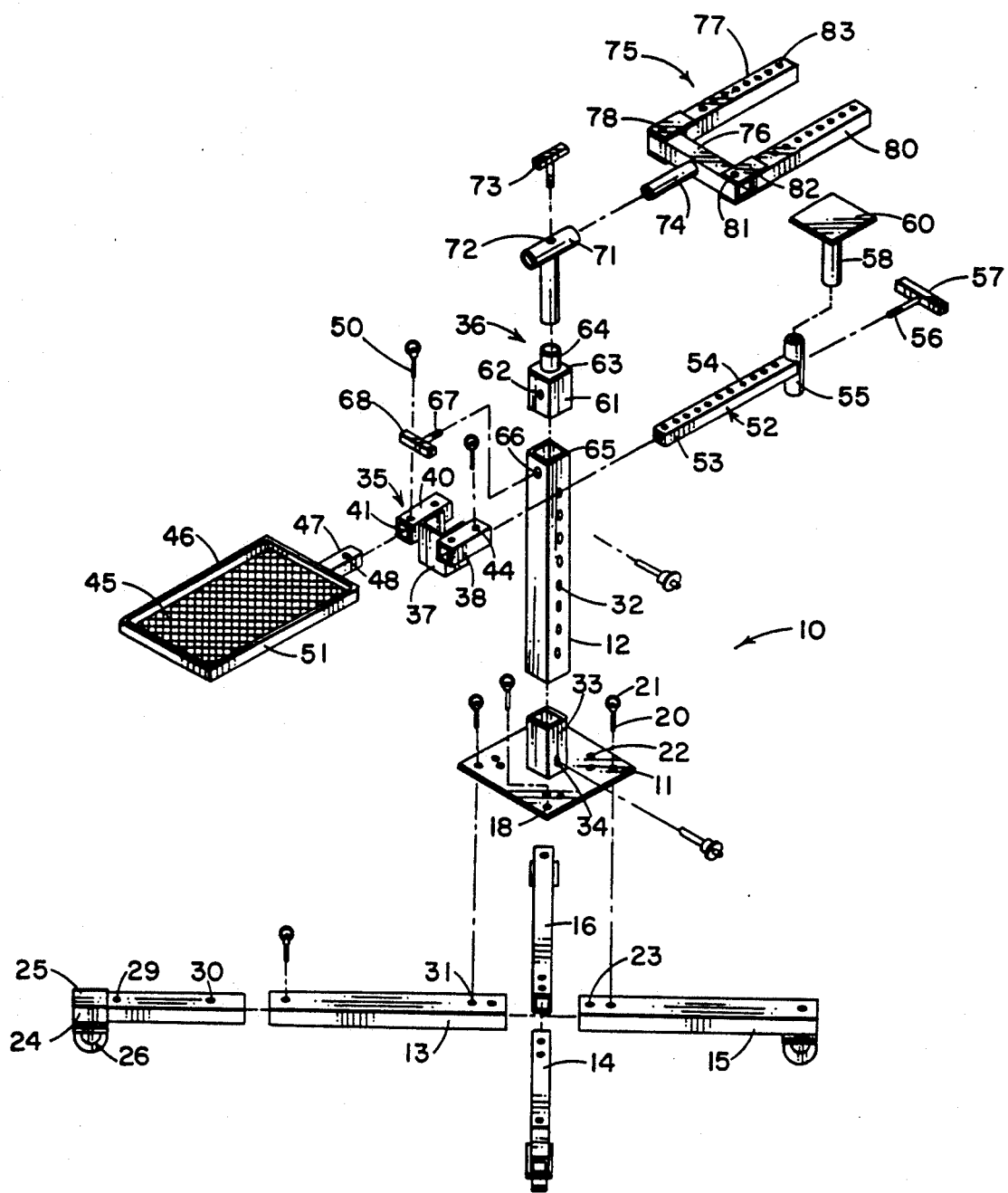
FIG. 2 is an exploded perspective view of a work station for use in accordance with FIG. 1.

Referring to FIGS. 1 and 2 of the drawings, a universal work station 10 is illustrated having a base 11 with a vertically extending post 12 along with a pair of telescoping legs 13 and 14 and a pair of non-telescoping legs 15 and 16. The base can be seen to be a flat square piece of heavy steel having a square channel steel post 12. The legs 13, 14, and 15 are hollow channeled steel members, each one of which is attached to the base 11 with bolts 17 passing through apertures 18 in the base plate 11. A plurality of pins 20 having handles 21 thereon can be inserted in one of the two different openings 22 for each leg so that by swinging the leg on the bolt 17 beneath the base 11, a hole 23 in each leg can be aligned with one of the holes 22 to lock the leg in different positions. This allows the legs to be positioned in at least two different positions in which the telescoping legs 13 and 14 can be extended in the same general direction for holding a heavy cantilevered type object as seen in FIG. 4 and the two legs 15 and 16 can be positioned for better side support. The telescoping legs 13 and 14 each have a telescoping leg member 24 which supports the wheel or caster in a supporting bracket 25 having a wheel 26 therein. The telescoping leg is extended by lifting the quick coupling pin 27 by its handle 28, then telescoping the telescoping portion 24 outwards where the pin 27 will align with a second hole 30 in the telescoping arm. A hole 31 allows the pin to hold the leg in the non-extended position. The pins 20 are attached through the openings 18 and also through the openings 31 in each of the legs. The vertically extending posts 12 includes a plurality of apertures 32 spaced in equal increments and is a square channel that slides over a post supporting bracket 33 and shaped like a square channel and having an aperture 34 therein for alignment with the bottom aperture 32 of the vertically extending post 12. The post supporting bracket 33 can be welded to the base plate 11.

The apertured post 12 has a post attaching coupling member 35 and a post top attaching coupling 36. The side coupling 35 has a U-shaped bracket 37 and two square channel sleeves 38 and 40, each of which is hollow and has a plurality of openings 41 therein. Similarly, the U-bracket has an aperture 42 in each arm of the "U" so that the U-bracket portion 37 can be slipped over vertically extending post 12 and a pin 43 slipped through the apertures 42 and through any one of the apertures 32 in the vertically extending post 12. This thereby attaches the pair of sleeves 38 and 40, each of which have a pair of apertures 44 therein to allow the coupling of any work or tool support desired which has a square bar attached on one end, such as a tool or work supporting tray 45 having edges 46 and a square tray supporting bar 47 having an aperture 48 therein. Sliding the bar 47 into either one of the sleeves 38 and 40 and sliding a quick attaching pin 50 into one of the opening 44 attaches the tray to the work station. The tray 45 has a magnet strip 51 along one lip 46 so the tools may be supported thereon and can be rapidly grasped and returned while working on a workpiece. The tools can also be supported in the tray 45. A universal coupling 45 can also have a second work or tool support member 52 attached thereto which has a square supporting bar 53 having a plurality of openings 54 therein and having a hollow sleeve 55 attached perpendicular to the bar 54. Sleeve 55 has a threaded aperture therein so that a threaded locking member 56 having a handle 57 can be screwed therein to lock a piece having a cylindrical bar member 58 sliding in the sleeve 55 and then locked with the threaded locking member 56 in any position desired.

Similarly, the cylindrical coupling bar 48 can be allowed to rotate freely within the sleeve 55 as desired and a plate 60 attached to the cylindrical coupling member 58 can be used to support a work member or a vise or any other desired work piece or another tray. The plate 60 can be rapidly removed from the sleeve 55 and another member slipped into the sleeve to change the work piece, work holder, or work table by merely loosening the threaded lock 56, removing the sleeve coupling 58 from the sleeve 55 and replacing it with another member.

Referring now to top of the work post, top coupling 36 includes a square coupling member 61 having an aperture 62 therethrough with a flange 63 on top of the square insert portion 61 and a cylindrical support coupling member 64 attached to the top of the flange portion 63. The square coupling portion 61 can be inserted into the top 65 of the post 12 which has a threaded opening 66 therein for locking the coupling member 61 with the threaded lock 67 having a handle 68. Thus, the member 61 can be slid into the top opening 65 of the post 12 and the threaded lock 67 threaded into the opening 66 and into the opening 62 of the coupling member 61 to lock it in place or to quickly remove it as desired. Once this is locked in place, a hollow cylindrical coupling member 64 and a coupling member 70 may have a perpendicular extending coupling sleeve 71 attached thereto sleeve 71 has a threaded aperture 72 therein for locking the coupled member with the threaded lock 73. Thus, any work holding member having a cylindrical shaped rod, such as the rod 74 of the universal work supporting bracket 75, can be slid into the cylindrical member 71. The work supporting bracket 75 can then be rotated to any position desired and locked in position by screwing the coupling lock 73 down onto the cylinder rod 74.

The universal work supporting bracket 75 has a fixed arm 76 attached to the perpendicularly extending coupling portion 74 and has arms 77 pinned with pin 78 to one end of the support 76 and an arm 80 pinned with pin 81 to the other end thereof using a yoke portion 82 on the end of the arms 77 and 80, the arms 77 and 80 each have a plurality of apertures 83 therein. Thus, the arms 77 and 80 can each be swung at an angle on the pin 78 and 81 to align the holes 83 up with a variety of different small engines, motors, generators, which can be bolted thereto. The workpiece can then be rotated to any position desired by rotating the universal work supporting bracket 75 to rotate the cylindrical bar 74 in the sleeve 71 and locking it in place with the locking member 73.

Turning now to FIGS. 3 through 7, a universal work stand 90 can be seen having a base 91 with the vertically extending post 92 having a plurality of apertures 93 therein. The post 92 is removably attached to the base 91 with the threaded attachment member 94 having the handle 95 and threaded into the post 92. The work stand 90 has a tray 96 attached thereto which may be similar to the tray 46 in FIG. 1 having a screen base as desired. The tray is held by a horizontally extending post 97 attached with a U-bracket 98 and it may be attached similar to the attachment illustrated in FIGS. 1 and 2. A vehicle wheel 100 is seen having a tire 101 mounted to a wheel 102 having a rim 103 and a lip flange 104 around the edge of the rim 103. A plurality of lug openings 105 are positioned around the wheel 102 and an axle opening 106 is in the center thereof. The tire 101 has a threaded surface 107 and an annular bead 108 around the lip flange 104.

Figure 3:
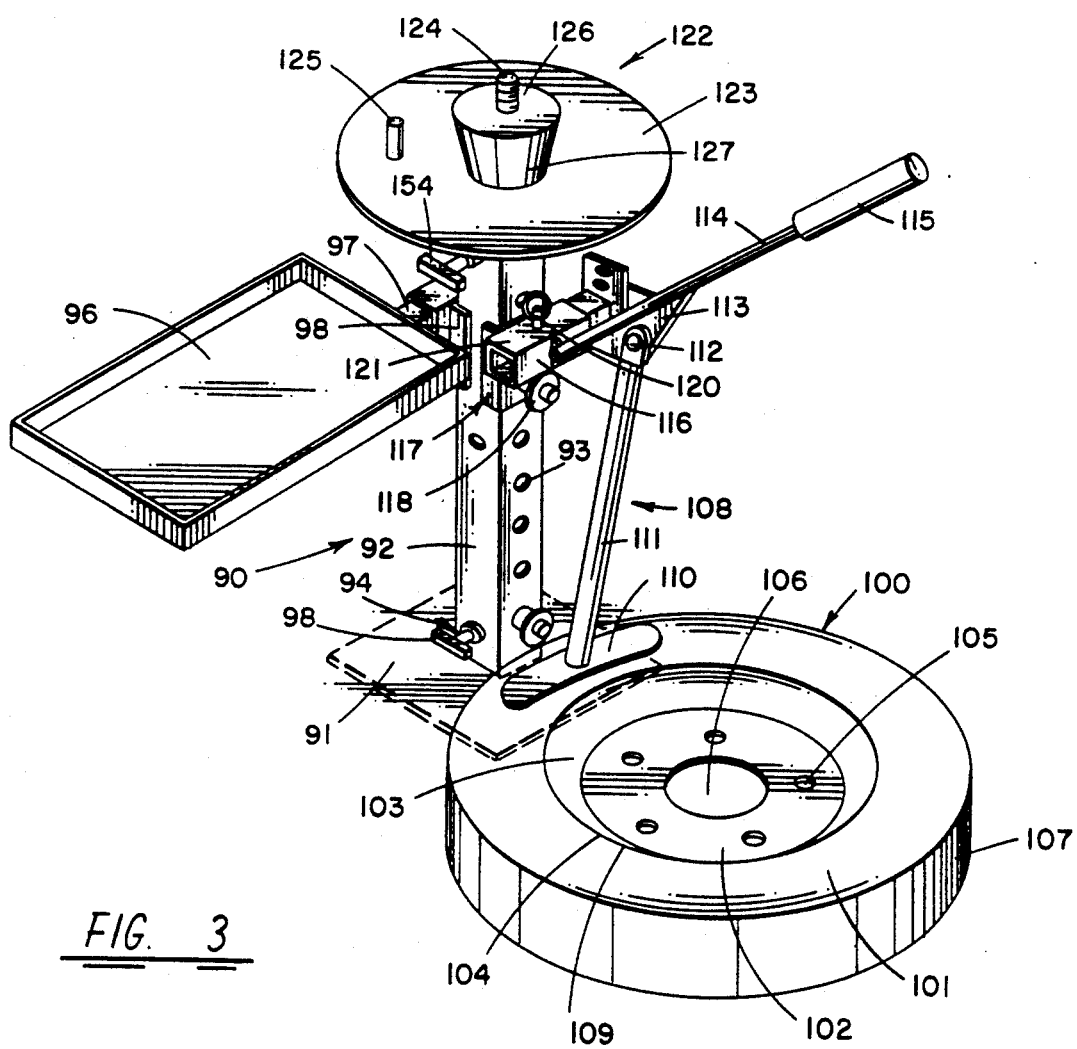
FIG. 3 is a perspective view of a tire changing tool formed on the work station of FIGS. 1 and 2.

The tire changing tool of FIGS. 3 and 4 includes a tool 108 for breaking the tire bead from the wheel flange 104 and includes an arcuate angled work surface 110 attached to a rod 111 which is pinned with a pin 112 to a bracket portion 113 attached to a leverage arm 114 having a handle 115. The arm 114 is pinned with a pin 116 to the coupling 117 which is coupled to the post 92 with a rapidly removing attachment pin 118) and has a threaded locking member 120 for holding the channel shaped base 121 to the post 92.

In operation, the tool portion 110 is placed adjacent the wheel flange 104 along the tire bead of the tire 101 and the handle 115 is pulled producing a mechanical leverage to drive the tire edge away from or to break the seal between the tire and the wheel once the air has been removed from tire. The wheel 100 is then picked up and placed on the wheel work support 122 which has a disc shaped surface 123 for placing the center of the wheel over the threaded center 124 which extends through the axle opening 106 of the wheel 100. In addition, a position locking pin 125 can extend through one of the lug openings 105. A wheel locking chuck 126 is threaded onto the post 124 so that the angled surface 127 wedges into the axle opening 106 to look the tire in place. The wheel support portion 122 is fixedly mounted to the top of the post 92 so that the wheels are looked in place while extending the T-bar between the flange 104 and the bead 108 of the tire to lift the tire over the edge of the wheel rim.

FIG. 4 shows a base 91 having a plurality of nuts 130 therethrough for anchoring the base to a surface with a post 92 extending therefrom and with a rapid detaching pin 131 along with the threaded locking member 94.

Figure 5:
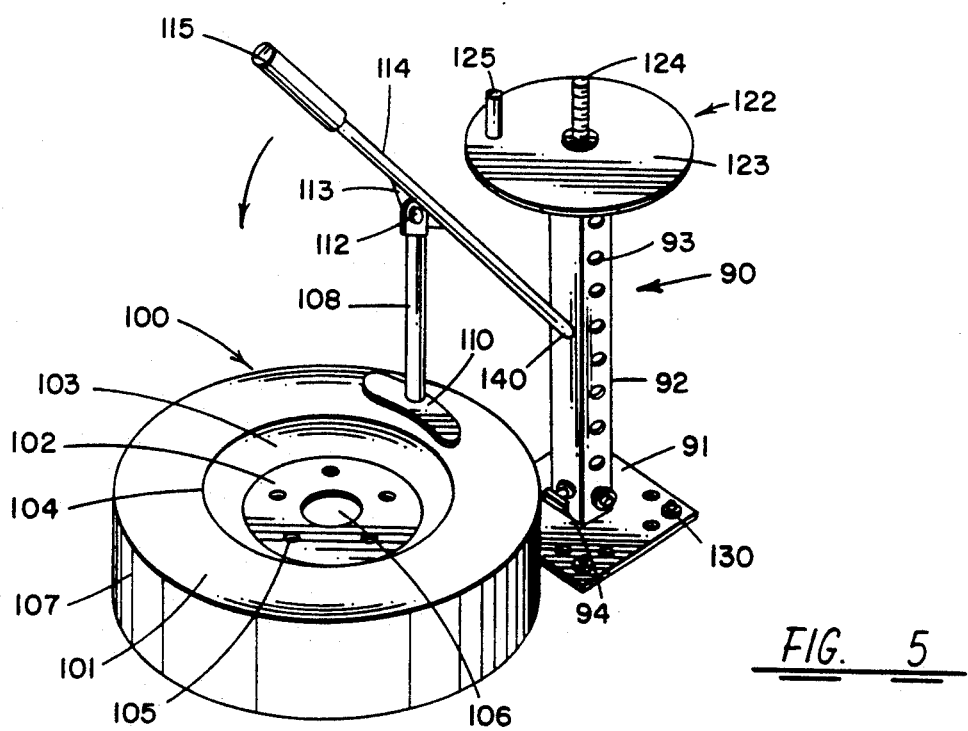
FIG. 5 is a perspective view of another embodiment of the tire changing tool of FIG. 3 having the wheel support removed.

FIG. 5 shows a modified embodiment of the workstand 90 set up adjacent to the tire 100 and having the tire and wheel separating tool portion 110 of the tool 108 positioned against the tire 101 adjacent the lip flange 104 on the wheel 102. The handle 115 of the leverage arm 114 can then be pulled to break the tire from the wheel. In this alternate embodiment, the leverage bar 101 is inserted into an opening 140, as seen in the exploded view of FIG. 7, rather than being pinned to an attachment, as shown in the embodiment of FIG. 3.

In FIG. 6, the tire and wheel 100 having the tire 101 attached to the wheel 102 placed on the wheel work support 122 and fixedly locked in place with the wheel locking chuck 126 threaded onto the threaded locking bolt 124. A tire removal bar 141 has an elongated steel bar 142 having an S-shape or serpentine end tool portion 143 on the end thereof so that the portion 143 can be inserted between the wheel rim 103 and the edge 44 of the tire 101 and braced against the chuck 126, as shown in FIG. 6. The bar 142 can then be rotated around the tire by a workman walking around the tire to loosen the tire from the wheel.

The exploded view of FIG. 7 more clearly shows the individual parts of the simplified embodiment of FIGS. 5 and 6 and shows the quick removal pin 144 for quickly attaching the wheel work support 122 along with the threaded opening 145 for locking in the locking bolt 146 of FIG. 3. Also more clearly shown in the exploded view is the square channel vertically extending post holding portion 146 fixedly attached to the base 91 for attaching the post, as shown in FIG. 4.

It should be clear at this point that the tire tool of FIGS. 3 through 7 can easily be converted to a more general purpose workstand which can be quickly accomplished by unlocking and removing the wheel work support 122 and replacing a more universal attachment in the end of the post 92, such as shown in FIGS. 1 and 2, and by removing the wheel tool attached with the tire tool coupling 117 therefrom in FIG. 3 or by sliding the tire tool arm 114 out of the opening 140, as shown in FIGS. 5 and 7, and then by attaching trays 96, as shown in FIG. 3, or 45, as shown in FIG. 1, and any other work attachments as desired. The base 91 can have the legs 13, 14, and 16 attached thereto with the wheels for portability of the workstand which can then be rapidly reconverted to a universal tire changing tool which allows for the rapid removal of the tire from the wheel. However, the present invention is not to be construed as limited to the forms shown which are to be considered illustrative rather than restrictive.

I claim:

1. A universal tire changing tool comprising:
    a base;
    a post having two ends, one end being attached to said base and extending in a generally vertical direction therefrom;
    a plurality of legs attached to said base, at least two of said legs being adjustable for switching between first and second positions;
    work support means, including a vehicle wheel work support attachment removably attached to said post for attaching and holding a vehicle wheel to said work station, said vehicle wheel attachment being attached to said post other end to attach a vehicle wheel extending over said post;
    a tool tray attachment removably attachable thereto to said post;
    a workpiece attachment for said work station being removably attached to said post, and said workpiece attachment being a multi-purpose workpiece attachment having a post coupling attached to a frame member rotatably on said post and having a pair of angularly adjustable arm pinned to said frame member, each said adjustable arm having a plurality of openings therethrough whereby a workpiece can be bolted to said arms through said holes therethrough; and
    a tire removing tool removably attached to one side of said post, said tire removing tool being movably attached to said post for shifting between operative and inoperative positions whereby said tire removing tool can be readily moved to an operative position against a tire positioned adjacent said tire changing tool prior to attaching said wheel to said work support means.

2. A universal tire changing tool in accordance with claim 1 in which said vehicle wheel work support attachment has a coupler thereon for coupling onto the other end of said post.

3. A universal tire changing tool in accordance with claim 2 in which said vehicle wheel work supporting attachment coupler has a square insert attached to said work support means and removably inserted into a square post for supporting on the other end of said post and said square insert being locked in place with a threaded lock threaded through said post into the side of said square insert.

4. A universal tire changing tool in accordance with claim 3 in which said tire removing tool is movably attached to said post and includes a post attachment member with a "U" bracket shaped to fit around said post and bolted to holes in said post.

5. A universal tire changing tool in accordance with claim 1 in which each said leg is pinned for rotation on said base and each leg has aligning openings therein and said base has openings therein for locking each said leg to a predetermined opening in said base with a lock pin in a predetermined position.

6. A universal tire changing tool in accordance with claim 1 in which said post has a plurality of openings therethrough for attaching a tool tray in different positions on said post.

7. A universal tire changing tool in accordance with claim 6 in which said tool tray attachment has a screened bottom and is supported on an extendible arm.

* * * * *